US009354910B2

(12) United States Patent
Ivanov et al.

(10) Patent No.: US 9,354,910 B2
(45) Date of Patent: May 31, 2016

(54) METHOD FOR CERTIFICATION OF RECONFIGURABLE RADIO EQUIPMENT WHEN RECONFIGURATION SOFTWARE DEVELOPED BY THIRD PARTY

(71) Applicant: Intel Corporation, Santa Clara, CA (US)

(72) Inventors: Vladimir Ivanov, St. Petersburg (RU); Markus Dominik Mueck, Neubiberg (DE); Hossein Alavi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 110 days.

(21) Appl. No.: 14/139,282

(22) Filed: Dec. 23, 2013

(65) Prior Publication Data

US 2015/0178112 A1    Jun. 25, 2015

(51) Int. Cl.
*G06F 9/455* (2006.01)
(52) U.S. Cl.
CPC ........ *G06F 9/45533* (2013.01); *G06F 9/45504* (2013.01)
(58) Field of Classification Search
CPC .................................................. G06F 9/45533
USPC ....................................................... 718/1–108
See application file for complete search history.

(56) References Cited

U.S. PATENT DOCUMENTS

| 8,863,122 B2 * | 10/2014 | Bouchier | G06F 9/4843 |
| | | | 709/208 |
| 8,970,350 B2 * | 3/2015 | Diaz | H04Q 9/00 |
| | | | 340/10.1 |
| 2005/0223191 A1 * | 10/2005 | Ferris | 712/28 |
| 2006/0058976 A1 * | 3/2006 | Ferris | G06F 9/45537 |
| | | | 702/123 |

(Continued)

FOREIGN PATENT DOCUMENTS

| CN | 104731637 A | 6/2015 |
| EP | 2887217 A1 | 6/2015 |

OTHER PUBLICATIONS

Mueck, M. D., et al. "Reconfigurable radio systems as enabler for exploiting the future heterogeneous wireless communications landscape." ETSI Reconfigurable Radio Systems Workshop. 2012, pp. 1-17.*

(Continued)

*Primary Examiner* — Satish Rampuria
(74) *Attorney, Agent, or Firm* — Alpine Technology Law Group LLC

(57) ABSTRACT

A radio equipment comprises waveform generator to receive input data and to generate output baseband waves corresponding to the received input data, and a radio-frequency component to transform the baseband waves generated in radio waves. The waveform generator comprises a Radio Virtual Machine (RVM) that has been compiled to operate on hardware underlying the RVM. The RVM comprises an associated RVM class that establishes a level of reconfigurability of low-level parameters of the RVM. The RVM class comprises one of a plurality of RVM classes in which each RVM class comprises a corresponding level of reconfigurability of low-level RVM parameters and a corresponding level of certification testing for reconfigured RVMs of the class. In one exemplary embodiment, the plurality of RVM classes comprises at least one RVM class comprising full reconfigurability of low-level RVM parameters and at least one RVM class comprising limited reconfigurability of low-level RVM parameters.

17 Claims, 10 Drawing Sheets

(56) References Cited

U.S. PATENT DOCUMENTS

2007/0011334 A1* 1/2007 Higgins et al. ............... 709/227
2013/0007734 A1* 1/2013 McCloy .......................... 718/1
2014/0115583 A1* 4/2014 Lee et al. ........................ 718/1
2014/0282544 A1* 9/2014 Smith et al. .................... 718/1

OTHER PUBLICATIONS

Abdallah, Riadh Ben, et al. "Virtual machine for software defined radio: Evaluating the software vm approach." Computer and Information Technology (CIT), 2010 IEEE 10th International Conference on. IEEE, 2010, pp. 1970-1977.*

Gultchev, Stoytcho, et al. "Evaluation of software defined radio technology." Centre for Communication System Research, University of Surrey (2005), pp. 1-71.*

European Search Report received for European Patent Application 14193660.9, mailed on Mar. 18, 2015.

Abdallah, Riadh Ben et al., "Virtual Machine for Software Defined Radio: Evaluating the Software VM Approach", conference, 2010, 1970-1977, IEEE, Piscataway, NJ.

"Reconfigurable Radio Systems (RRS); Radio Reconfiguration related Requirements for Mobile Devices", 2013, 22 pages, European Telecommunications Standards Institute, France.

* cited by examiner

METHOD FOR CERTIFICATION OF RECONFIGURABLE RADIO EQUIPMENT WHEN RECONFIGURATION SOFTWARE DEVELOPED BY THIRD PARTY

TECHNICAL FIELD

Embodiments described herein relate to Radio Virtual Machines (RVMs). More particularly, embodiments of described herein relate to classes of RVMs, levels of reconfigurability of low-level parameters of an RVM and levels of certification testing associated with the various RVM classes.

BACKGROUND

Certifying that a Radio Virtual Machine (RVM) is operating in accordance with applicable laws, regulations and/or standards presents an inherent challenge. The situation becomes more complex if an RVM has been reconfigured by a reconfiguration Radio Application (RadioApp) that has been developed by a third-party developer. Depending upon the particular RadioApp, the various low-level parameters of the RVM that can be reconfigured necessitate different levels of certification testing to verify that a reconfigured RVM that has been compiled for a particular underlying hardware together with the underlying hardware operationally conforms to applicable laws, regulations and/or standards.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1:
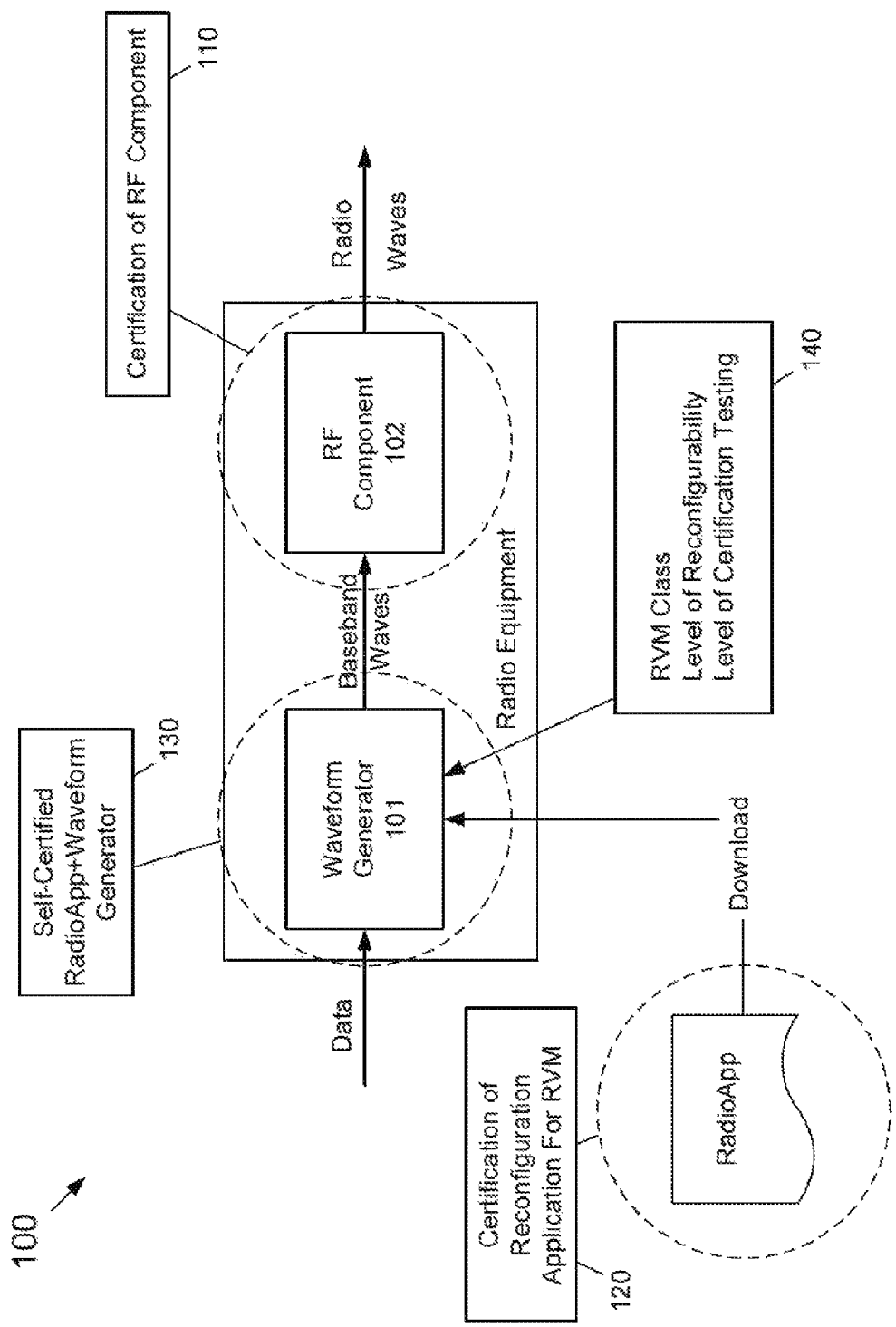
FIG. 1 depicts a functional block diagram of a radio equipment (RE) according to the subject matter disclosed herein.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Embodiments described herein relate to Radio Virtual Machines (RVMs). More particularly, embodiments of described herein relate to classes of RVMs, levels of reconfigurability of low-level parameters of an RVM and levels of certification testing associated with the various RVM classes. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The subject matter disclosed herein relates to embodiments of Radio Virtual Machines (RVMs) comprising selectable RVM classes that respectively correspond to different levels of reconfigurability of low-level parameters of an RVM. Additionally, each different RVM class also corresponds to (i.e., linked to) a different level of certification testing that is related to the level of reconfigurability of the low-level parameters of the RVM class. At one extreme of RVM class, a high-level RVM class corresponds to full reconfigurability of the low-level parameters of an RVM, and accordingly necessitates a relatively more extensive certification testing process after the RVM has been reconfigured. At the other extreme of RVM class, a low-level RVM class corresponds to a limited reconfigurability of the low-level parameters of an RVM. Because the reconfigurability of the low-level parameters of this particular class of RVM is limited, a relatively less extensive certification testing process is necessitated after the RVM has been reconfigured. Moreover, according to the subject matter disclosed herein, an RVM can have different RVM classes associated with different components of the RVM that relates to the reconfigurability of the low-level parameters of the respective components of the RVM.

In one exemplary embodiment, an RVM may be implemented as an execution environment for third-party software that provides an abstraction from the processing elements underlying the RVM. A third-party software developer maps either manually or through automated tools the various software code components onto available underlying processing elements. For example, the execution environment can be implemented as a virtualization software execution environment that abstracts from one or multiple underlying general-purpose processor, digital signal processing processors, microcontrollers, Software-Defined Radio (SDR) base-band processors, etc. An RVM may also access and/or provide access to special-purpose processing elements that are implemented independently of a general-purpose (or similar) processing unit, such as a (Fast) Fourier Transform, FIR (Finite Impulse Response) Filters, IIR (Infinite Impulse Response) Filters, Turbo Encoders/Decoders, LDPC (Low Density Parity Check) Encoders/Decoders, etc. In an alternative exemplary embodiment, an RVM provides no abstraction from the available underlying processing elements, and a third-party software developer maps either manually or through automated tools the various software code components onto available processing elements.

An RVM may be configured by an OEM, a third-party software developer, a National Regulation Authority (NRA) or any other suitable stakeholder to provide protection against erroneous and/or malicious third-party software components. Depending on the configuration of the RVM, the third-party software may have more or less access to selecting key system parameters, such as output power levels, bandwidth, modulation type (e.g., OFDM, OFDMA, etc.), out-of-band radiation levels, etc.

One exemplary embodiment of an RVM may provide third-party software developers to access to all, some or none of the RVM system processing elements implemented by an OEM. In an exemplary RVM embodiment in which a third-party software developer has access to all RVM system components implemented by an OEM, some or all of the available RVM system components may be replaceable by third-party software.

In an exemplary RVM embodiment in which a third-party software developer has access to some RVM system components implemented by an OEM, such as but not limited to, a Forward Error Correction component, Multiple-Input-Multiple-Output (MIMO) encoder/decoder components, the RVM system components available to a third-party software developer would be replaceable by third-party software. In an exemplary RVM embodiment in which a third-party software developer has access to some RVM system components implemented by an OEM and to only output/input ports from/to other RVM system components, only the available RVM system components to which a third-party software developer has access would be replaceable by third-party software. For the RVM system components for which only output/input ports from/to the RVM system components, such as a full modem base-band environment, are accessible, a third-party software developer may replace all of the base-band components by accessing to the base-band input/output signals and by implementing a replacement full modem base-band environment on the RVM through third-party software. In yet another exemplary RVM embodiment, part of the processing capability/power of a selected processing element of an RVM may be used for OEM-specific purposes, while some or all of the remaining processing capability/power of the processing element is made available for the execution by third-party software.

One exemplary RVM embodiment may only provide access to a component of an existing underlying platform, such as, a mobile device modem platform. Yet another exemplary RVM embodiment may comprise specific processing elements that are reserved for executing third-party software. Still another exemplary embodiment of an RVM may provide limited access to base-band related features, or alternatively may enable third-party software developers to also provide new RF (Radio Frequency) front-end-related features. An RVM may execute one or multiple third-party software components sequentially or simultaneously. Yet another exemplary RMV embodiment may enable a third-party software developer to add new features to a given Radio Access Technology (RAT) that may or may not be defined in a particular standard. Accordingly, a third-party software developer may provide features that are beyond the scope of the particular standard.

The term "radio equipment (RE)" is defined to be "a product which intentionally emits radio waves in order to serve its purpose, or a product which must be completed with an accessory, such as antenna, so as to emit radio waves in order to serve its purpose" by the Proposal for the Directive of the European Parliament and of the Council on the harmonisation of the laws of the Member States relating to the making available on the market of radio equipment, 2012/0283 (COD) (the Directive). The term "radio waves" is defined to be "electromagnetic waves of frequencies from 9 kHz to 3000 GHz, propagated in space without artificial guide" in the same document. Thus, as defined by the Directive, radio equipment (RE) relates only to a transmitter product. As used herein, the term "radio equipment" is defined consistently with the aforementioned definitions from the Directive. Additionally, the term "radio equipment" as used herein comprises two parts: a waveform generator that generates baseband waves and a radio frequency (RF) component that transforms baseband waves generated in an RF range of spectrum into radio waves.

FIG. 1 depicts a functional block diagram of a radio equipment (RE) 100 according to the subject matter disclosed herein. Radio equipment 100 comprises a waveform generator 101 that receives data as an input and in response generates baseband waves, and a radio-frequency (RF) component or device 102 that transforms baseband waves generated in an RF range of spectrum into radio waves. According to the subject matter disclosed herein RE 100 comprises a Radio Virtual Machine (RVM) has been compiled for the hardware underlying the RVM, thereby translating the RVM into the actual machine of radio equipment 100. As used herein, the term "compile" and its variations can mean a direct implementation of an RVM in which a Radio Application (Radio-App) that is run in connection with the RVM is interpreted by the RVM, or a mapping of an RVM onto a target platform, in which case a RadioApp run in connection with the RVM is compiled into an executable code of the target platform. In one exemplary embodiment, radio equipment 100 comprises, but is not limited to, part of a cellular telephone, smartphone, smart-type device, or tablet-type device.

Figure 2:
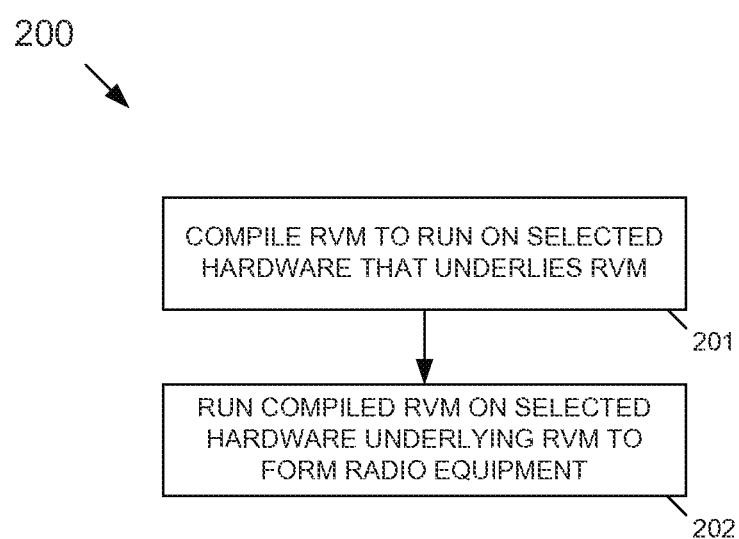
FIG. 2 depicts a flow diagram of an exemplary embodiment of a method for compiling an RVM for hardware underlying the RVM and running the compiled RVM on the hardware underlying the RVM to form a radio equipment according to the subject matter disclosed herein.

FIG. 2 depicts a flow diagram of an exemplary embodiment 200 of a method for compiling an RVM for hardware underlying the RVM and running the compiled RVM on the hardware underlying the RVM to form a radio equipment according to the subject matter disclosed herein. At 201, an RVM is compiled to run on selected hardware underlying the RVM. At 202, the compiled RVM is run on the selected hardware underlying the RVM to form the radio equipment.

At least one component of the compiled RVM operating on the underlying hardware of radio equipment 100 is represented by waveform generator 101. In one exemplary embodiment, the RVM operating of the underlying hardware of radio equipment 100 comprises an associated class that sets the level of reconfigurability of the low-level parameters of the RVM, as indicated at 140 in FIG. 1. In one exemplary embodiment, the reconfigurable low-level parameters that are accessible based on the RVM class are reconfigured by a reconfiguration Radio Application (RadioApp) that can be developed by a developer, such as the original developer of the RVM that has been compiled to form waveform generator 101, or alternatively a third-party RadioApp developer.

According to the subject matter disclosed herein, an RVM has an associated RVM class that corresponds to a particular level of reconfigurability of the low-level parameters of the RVM. That is, each different RVM class corresponds to a respectively different level of reconfigurability of the low-level parameters within an RVM of the class. Each different RVM class also corresponds to respectively different level of certification testing that is needed to verify that a reconfigured RVM that has been compiled for a particular underlying hardware together with the underlying hardware operationally conforms to applicable laws, regulations and/or standards. A particular RVM class can be selected for an RVM at the time the RVM is defined. Alternatively, the class associated with an RVM can be selectably changed after an initial class has been selected and assigned. In yet another exemplary embodiment, an RVM can have different classes selected and assigned to individual components of the RVM in addition to the RVM class assigned to the RVM as a whole.

At one extreme of RVM classes, the highest-level RVM class corresponds to full reconfigurability of the low-level parameters of an RVM, which thereby permits a RadioApp developer to completely access and reconfigure the low-level parameters of the RVM. At this level of reconfigurability, new waveforms for transmission could be designed for a reconfigured RVM that have any channel-usage characteristics, such as power levels, out-of-band-radiation, etc. The only limitations that would be associated with the highest-level RVM class would be related to the physical limitations that are imposed by the hardware underlying the RVM (e.g., the radio platform). The highest-level RVM class includes a corresponding relatively extensive certification testing process that is used for verifying that a compiled reconfigured RVM together with the underlying hardware for which the reconfigured RVM has been compiled operationally conforms to applicable laws, regulations and/or standards.

In one exemplary embodiment, reconfiguration of an RVM of the highest-level RVM class may necessitate that the certification testing process focus on certification of each reconfigured component of the RVM. In such a situation, each respective reconfigured component may need to be separately certified before one or more sets of reconfigured components are certified together. For example, a reconfigured RVM component "A" may need to be separately certified from reconfigured and certified RVM component "B." The certification process may then be such that the joint operation of separately certified reconfigured RVM components "A" and "B" may then be jointly.

At the other extreme of RVM classes, the lowest-level RVM class corresponds to a restricted reconfigurability of the low-level parameters of an RVM. For such a restricted level of reconfigurability, a RadioApp developer would only have limited access to the low-level parameters of an RVM. For example, the lowest-level RVM class would permit a RadioApp developer to have access to only the low-level parameters of the receive chain of an RVM. Accordingly, the lowest-level of RVM class would not need to utilize a corresponding detailed and thorough certification testing process because, for example, a radio platform operating a malfunctioning reconfigured RVM would not interfere with other radio platforms. Thus, level of certification testing for the lowest RVM class would be less extensive certification testing process than that used for the highest RVM class.

One or more medium- or intermediate-level RVM classes may also be established between the two extreme RVM classes that correspond to intermediate levels of reconfigurability of the low-level parameters of a RVM. An intermediate-level RVM class, for example, would allow more flexibility for reconfiguring low-level parameters of an RVM in comparison to the lowest-level RVM class, but would not permit the degree of reconfigurability that would be associated with the highest-level RVM class. Depending on the level of reconfigurability to the low-level parameters of an RVM, an intermediate-level RVM class may necessitate a certification testing process for a compiled reconfigured RVM and underlying hardware that is more extensive than that corresponding to the lowest-level RVM class, but less extensive than that corresponding to the highest-level RVM class. For example, in one exemplary embodiment a certification for an intermediate-level reconfiguration RadioApp might be obtained by contacting an authorized notified body and providing only a serial number for the reconfiguration RadioApp and an identification of the target device type on which the compiled reconfigured RVM would operate. In another exemplary embodiment, there would be no requirement for a joint certification of a reconfigured RVM component for simultaneous operation with other RVM components. That is, a certificate for a reconfigured RVM component "A" and a separate certificate for another reconfigured RVM component "B" would allow for a simultaneous operation of reconfigured components "A" and "B".

Another exemplary situation that may necessitate a relatively less extensive certification testing process would be a RadioApp developer that only reconfigures non-transmission-related low-level parameters, for example, low-level parameters relating to a data interleaver and/or a channel coder in the transmit/receive (TX/RX) chain of an RVM that otherwise has been defined to be of the highest-level RVM class. Because for this example nothing related to the spectral shaping of a transmitted signal is reconfigured by the reconfiguration of the data interleaver and/or channel coder, a relatively less extensive certification testing process could be used. Yet another exemplary situation that may necessitate a less extensive certification testing process would be a reconfiguration that involves changes that target predefined frequency bands and/or bandwidths. In still other exemplary situations, there may be reconfigurations for which a certification testing process may not be necessary.

FIG. 1 also depicts three phases of certification of a radio equipment that comprises a reconfigured RVM according to the subject matter disclosed herein. The first certification phase 110 relates to the initial certification of a radio equipment 100. The second certification phase 120 relates to a certification process for verifying that a reconfigured RVM that has been compiled for a particular underlying hardware together with the underlying hardware operationally conforms to applicable laws, regulations and/or standards. The third certification phase 130 relates to a self-certification process for verifying that a specific radio equipment comprising a reconfigured RVM that has been compiled for a specific underlying hardware of the radio equipment together with the specific underlying hardware operationally conforms to applicable laws, regulations and/or standards. It should be understood that the term "certification," "certification testing," and/or "certification procedure," as used herein means a process that verifies that conformance of a device and/or software operating on the device to applicable laws, regulations and/or standards.

The first certification phase 110 is performed for all radio equipment 100. The second certification phase 120 occurs in situations such as, but not limited to, an RVM that is to be reconfigured because, for example, the applicable laws, regulations and/or standards have changed or because, for example, an operational performance change is desired. According to the subject matter disclosed herein, the third certification phase can be performed as a self-certification that is performed on the particular radio equipment comprising the RVM that is has been reconfigured and compiled for the underlying hardware of the radio equipment. Alternatively, the third certification phase can be performed as a self-certification process performed by a vendor reconfiguration service.

Figure 3:
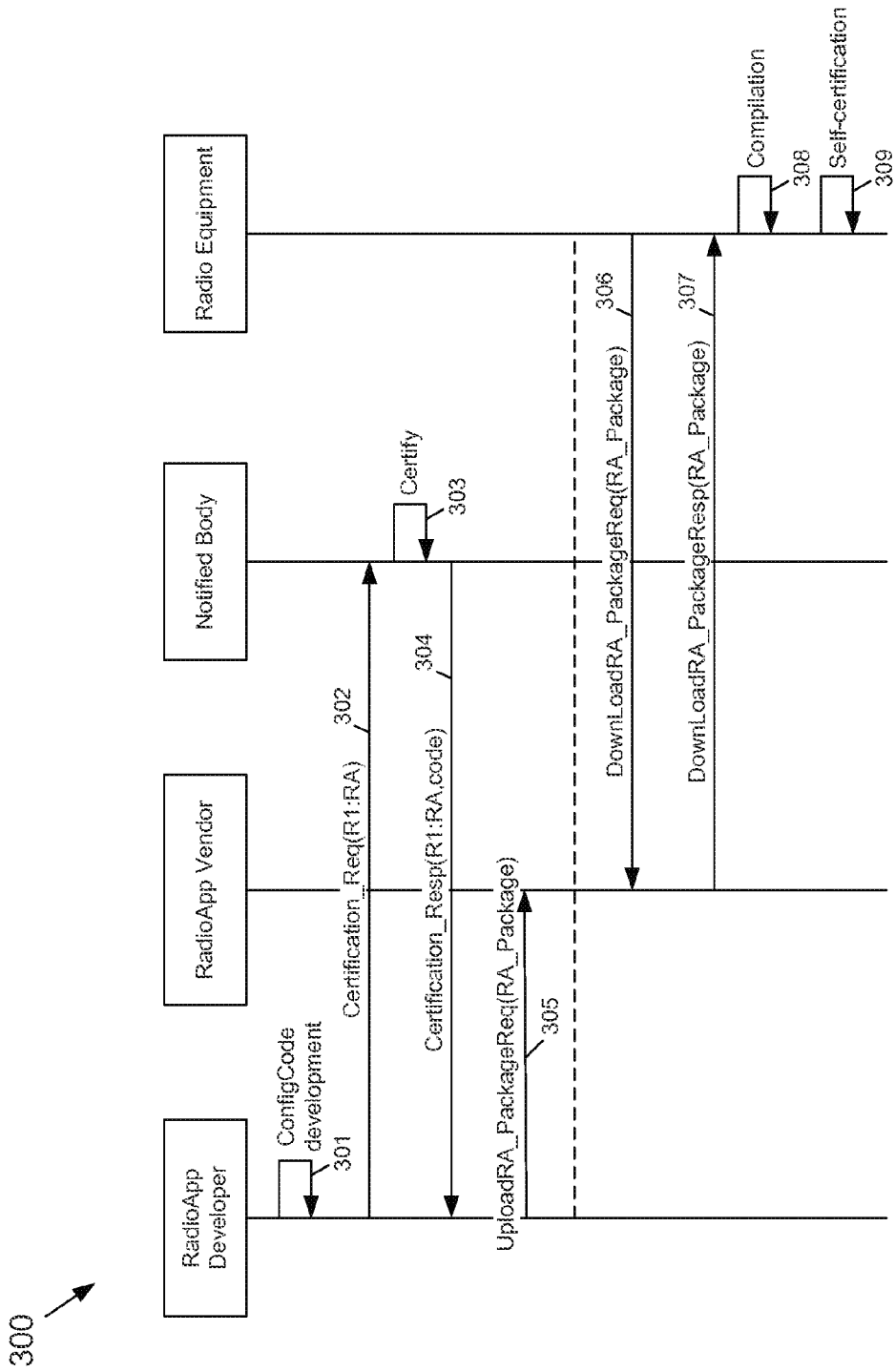
FIG. 3 depicts an exemplary sequence for the second and third certification phases for a situation in which the third certification phase is executed by the radio equipment that comprises the RVM that is being reconfigured according to the subject matter disclosed herein.
Figure 4:
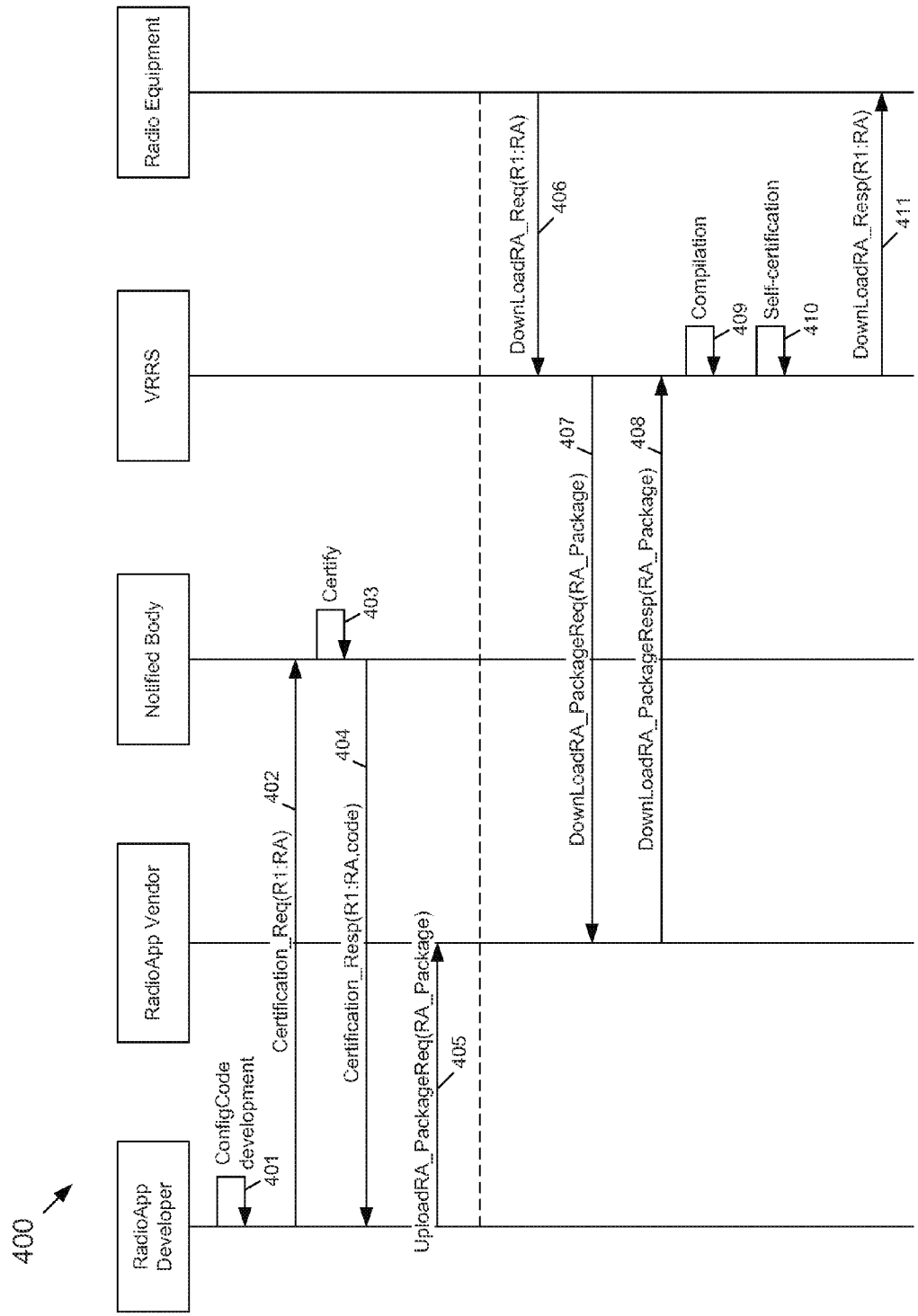
FIG. 4 depicts an exemplary sequence for the second and third certification phases for a situation in which the third certification phase is executed by a vendor radio reconfiguration service according to the subject matter disclosed herein.

FIG. 3 depicts an exemplary sequence 300 for the second and third certification phases for a situation in which the third certification phase is executed on the radio equipment that comprises the RVM that is being reconfigured according to the subject matter disclosed herein. FIG. 4 depicts an exemplary sequence 400 for the second and third certification phases for a situation in which the third certification phase is performed by a vendor radio reconfiguration service according to the subject matter disclosed herein. It should be noted that the first certification phase 110 is not depicted in either of FIG. 3 or 4 because the subject matter disclosed herein. For completeness, however, the first certification phase is described below.

The first certification phase 110 provides a certification testing process in which an initial certification test is executed on an Original Equipment Manufacturer (OEM) Radio Equipment (RE) by an authorized notified body. The first certification phase 100 includes two stages. In one exemplary embodiment, the first stage comprises an initial conformity testing and declaration of conformity certification that corresponds to a currently used certification testing for non-reconfigurable equipment. Details of an exemplary currently used conformity testing and declaration of conformity certification are set forth in TR 102 967, ETSI RRS, Use Cases for Dynamic Declaration of Conformity, 2012-09. Other initial conformity certification tests could additionally or alternatively be used.

Figure 5:
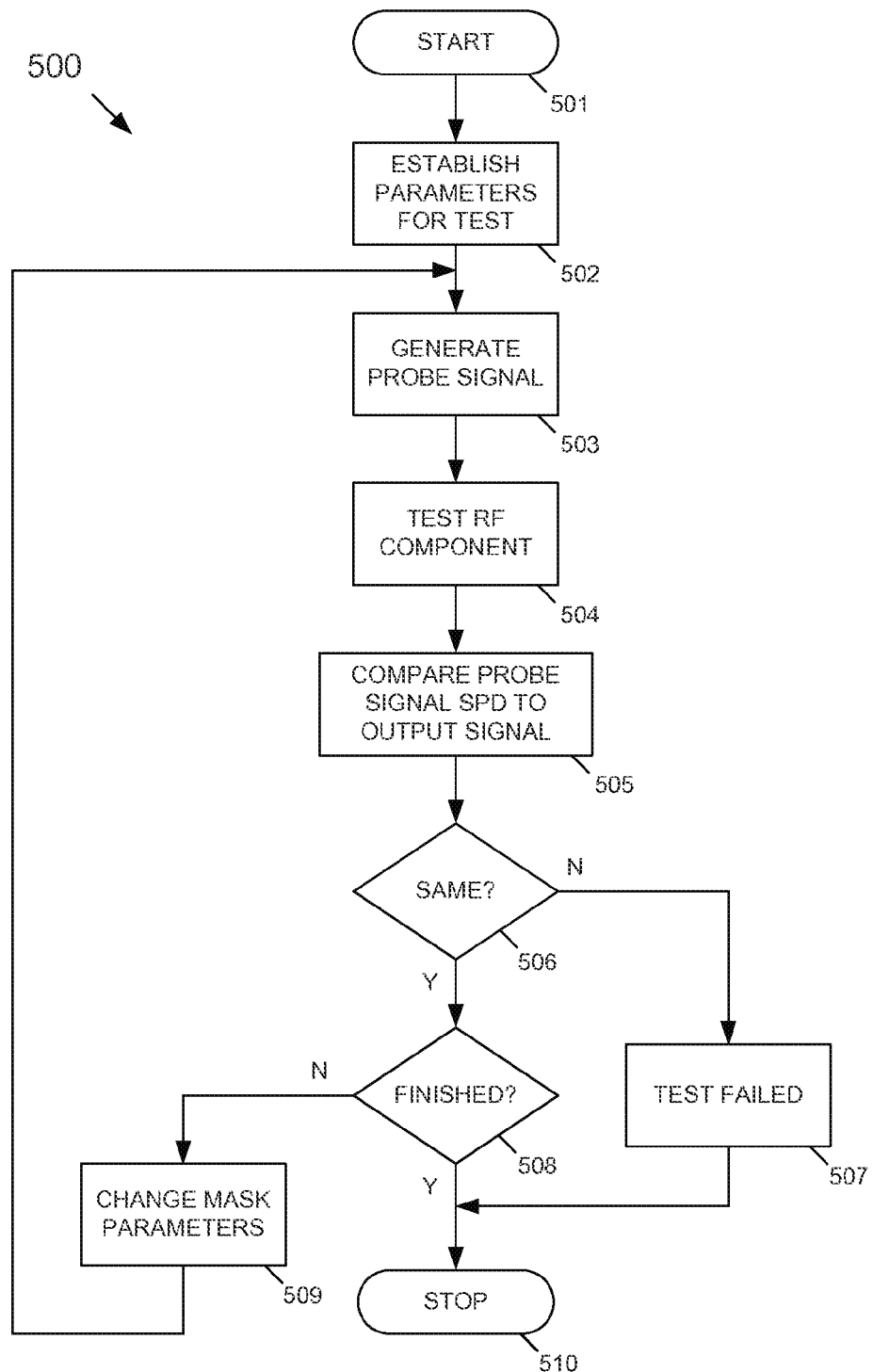
FIG. 5 depicts a flow diagram of an exemplary embodiment of an initial certification process of an RF component of a radio equipment according to the subject matter disclosed herein.

The second stage of the first certification phase 110 comprises an initial certification testing of the RF component 102. FIG. 5 depicts a flow diagram of an exemplary embodiment of an initial certification process 500 of an RF component of a radio equipment according to the subject matter disclosed herein. Process 500 begins at block 501. Flow continues to block 502 where parameters are established for the initial certification test of the RF component. Exemplary test parameters include, but are not limited to, the number of spectral masks and parameters of the individual spectral masks; the number of bands in the case of carrier aggregation; possible variations of spectral mask parameters; a frequency range $[F_{min}, F_{max}]$, in which $F_{min}, F_{max} \in$ [9 kHz, 3000 GHz]; and a frequency step if the spectral masks are moved from $F_{min}$ to $F_{max}$.

Figure 6:
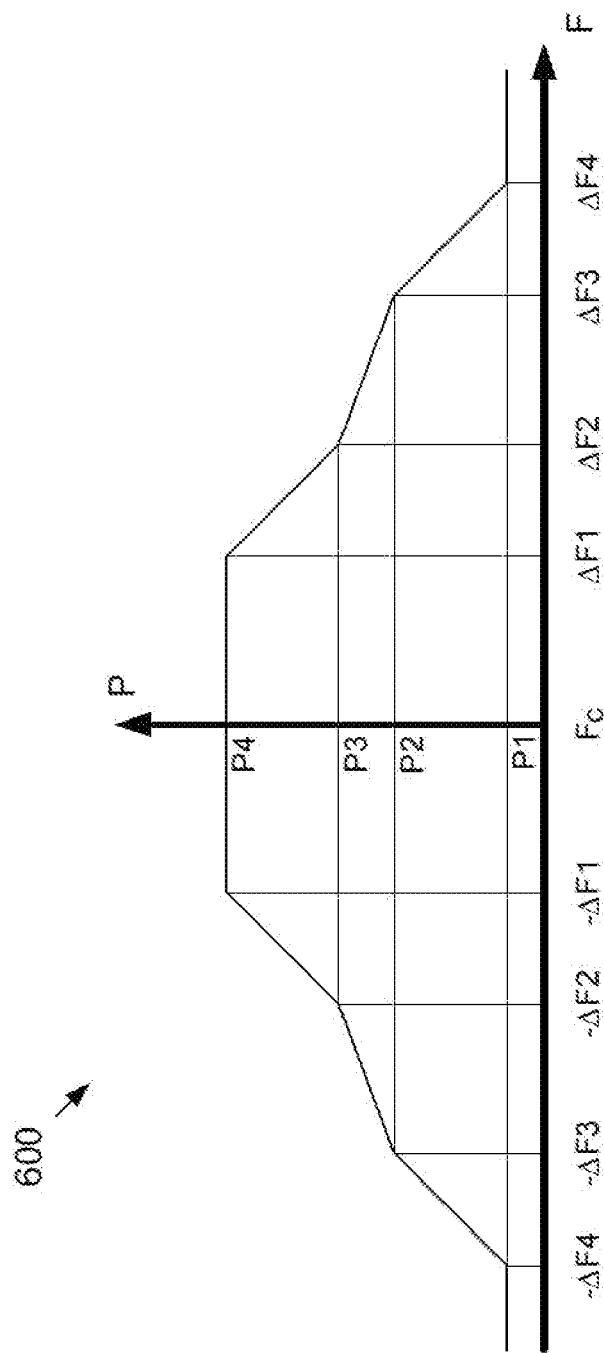
FIG. 6 depicts an exemplary spectral mask comprising exemplary parameters that could be used for establishing parameters for the second stage of an initial certification testing of an RF component according to the subject matter disclosed herein.

FIG. 6 depicts an exemplary spectral mask 600 comprising exemplary parameters that could be used for establishing parameters for the second stage of an initial certification testing of an RF component according to the subject matter disclosed herein. Spectral mask 600 comprises different relative power levels P4-P1 for respectively different frequencies $\Delta F1$-$\Delta F4$ with respect to a center frequency $F_C$. It should be understood that other spectral masks could be used that have different parameters that those that are depicted in FIG. 6.

Returning to FIG. 5, flow continues from block 502 to block 503 where a probe signal is generated by generating a pseudo-noise signal that is shaped according to a spectral mask that is being tested. Flow continues to block 504 where the RF component is tested by inputting the probe signal into the RF component and storing the signal that is output from the RF component. Flow continues to block 505 where the spectral power density (SPD) of the output signal is determined and compared to the spectral mask being tested. Flow continues to block 506 where it is determined whether the SPD of the output signal is the same as the spectral mask that has been established for the test. If, at block 506, it is determined that the SPD of the output signal is not the same as the spectral mask that has been established for the test, flow continues to block 507 where the test fails and the reason for the test failure is recorded. Flow continues to block 510, where the process ends.

If, at block 506, it is determined that the SPD of the output signal is the same the spectral mask that has been established for the test, flow continues to block 508 where it is determined whether the test is finished. If, at block 508, it is determined that the test is finished, flow continues to block 510, where the process ends. If, at block 508, it is determined that the test is not finished, flow continues to block 509 where the next established mask parameters are selected. Flow returns to block 503, and the process continues.

After successful completion of the two stages of the first certification phase 110, the one or more radio applications forming the initial RVM of the radio equipment 100 is certified and can then be installed by an OEM to be run in pre-defined set of multi-communication scenarios with RF component 102, and can be used for emission of new radio waves.

The second and third phases of certification 120 and 130 of a radio equipment 100 occur in situations in which an RVM of radio equipment 110 is to be reconfigured because, but not limited to, the applicable laws, regulations and/or standards have changed, and/or an operational performance change is desired. It should be understood that there may be other situations in which an RVM of a radio equipment is to be reconfigured. According to the subject matter disclosed herein, the RVM that is to be reconfigured has an RVM class that was selected and assigned when the RVM was defined. The class of the RVM corresponds to the level of reconfigurability of the low-level parameters of the RVM.

As depicted in FIG. 3, a RadioApp developer develops and provides the reconfiguration RadioApp at 301. Similarly, as depicted in FIG. 4, a RadioApp developer develops and provides the reconfiguration RadioApp at 401. It should be understood that although both FIGS. 3 and 4 indicate a RadioApp developer that develops and provides a reconfiguration RadioApp, the term "RadioApp developer" as used herein means the developer of the original RVM or a third-party reconfiguration RadioApp developer. Additionally, a difference between FIGS. 3 and 4 generally occurs at the third phase of certification 130. That is, the exemplary sequence for FIGS. 3 and 4 is generally the same until the third certification phase 130.

After development of the reconfiguration RadioApp, the second certification phase 120 for the reconfiguration RadioApp is performed by an authorized Notified Body certifying the reconfiguration RadioApp for the RVM. At 302 in FIG. 3 and at 402 in FIG. 4, a certification request (Certification_Req (R1:RA)) is sent to the notified body for the second certification phase 102 of a newly developed reconfiguration RadioApp. That is, the second certification phase 120 provides certification testing to verify that a reconfigured RVM that has been compiled for a particular underlying hardware together with the underlying hardware operationally conforms to applicable laws, regulations and/or standards. In one exemplary embodiment, the certification test for the second certification phase 102 would utilize a set of Radio Access Technology (RAT) specific test vectors as an input. For example, during the certification test, the spectral power density (SPD) of the generated radio waves is compared with the RAT-specific spectral mask. The second certification phase is performed at 303 in FIG. 3 and 403 in FIG. 4. Upon successful completion of the second certification phase 120, the Notified Body sends a certification response (Certification_Resp(R1: RA,code) to the RadioApp developer at 304 in FIG. 3 and 404 in FIG. 4. Successful completion of the second certification phase 120 signifies indicates that the reconfiguration RadioApp in combination with the RVM creates an abstract radio equipment that satisfies the requirements of second certification phase 120. At 305 in FIG. 3 and at 405 in FIG. 4, the RadioApp developer sends to the certified RadioApp to a RadioApp vendor.

Figure 7:
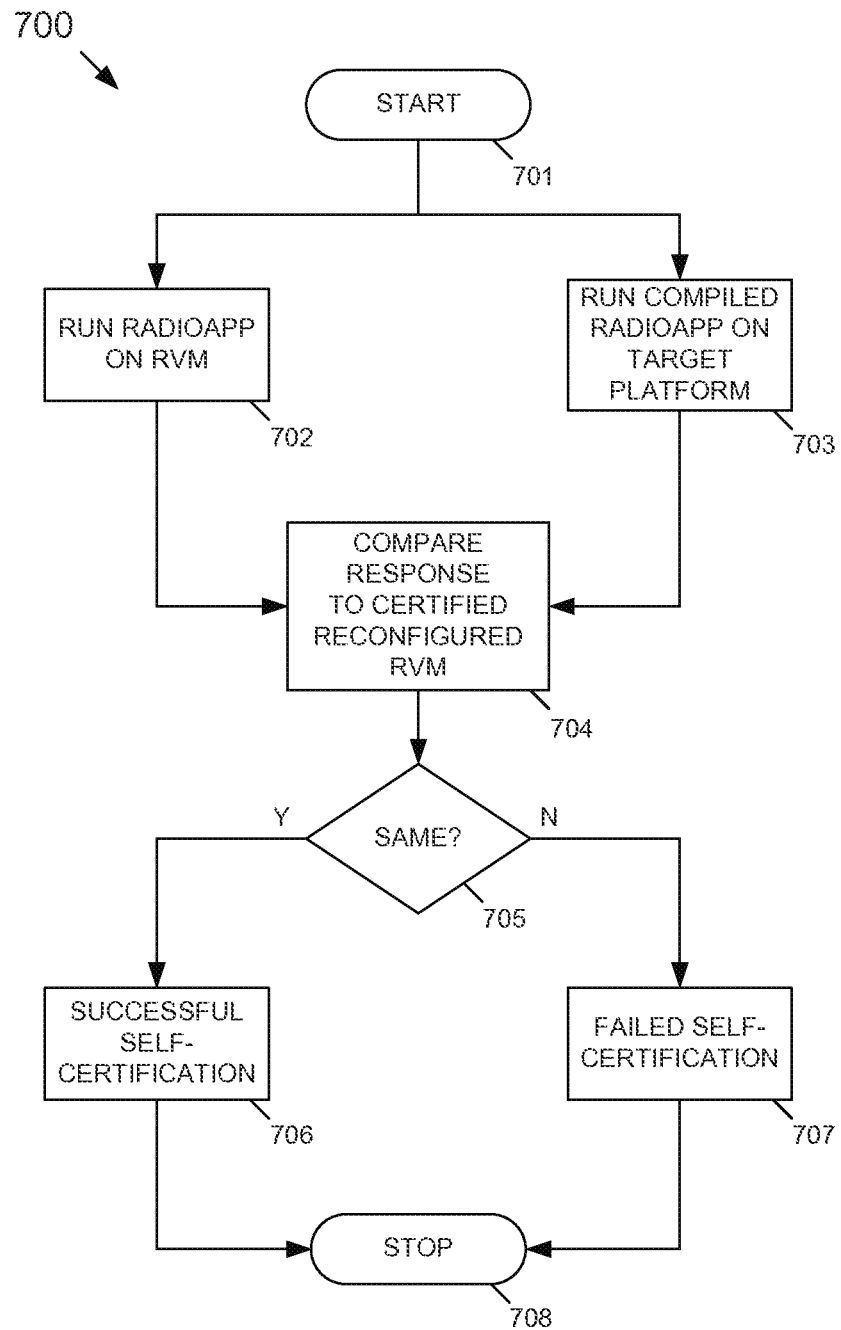
FIG. 7 depicts a flow diagram for a self-certification process according to the subject matter disclosed herein.

In one exemplary embodiment, the third certification phase 130 is executed by the radio equipment comprising the particular RVM that is being reconfigured. That is, the third certification phase 130 provides a certification testing relates to a self-certification process for verifying that a specific radio equipment comprising a reconfigured RVM that has been compiled for the specific underlying hardware of the radio equipment together with the specific underlying hardware operationally conforms to applicable laws, regulations and/or standards. In particular, FIG. 3 depicts a request 306 (DownLoadRA_PackageReq(RA_Package)) sent from a radio equipment for the certified RadioApp that reconfigures the RVM of the radio equipment. In one exemplary embodiment, request 306 is sent in response to a command received by the radio equipment from a user. In another exemplary embodiment, request 306 is sent by the radio equipment in response to receiving a command or a notification from a service provider to the radio equipment. In reply, the RadioApp vendor sends a response 307 (DownLoadRA_PackageResp(RA_Package)) to the radio equipment. At 308, the received RadioApp is compiled on the radio equipment. At 309, a self-certification process for the compiled reconfiguration RadioApp is run on the radio equipment. FIG. 7, which is described in greater detail below, depicts a flow diagram for a self-certification process 700 according to the subject matter disclosed herein.

In another exemplary embodiment, the self-certification of the third certification phase 130 is executed by a Vendor Reconfiguration Radio Service (VRRS) and the certified reconfiguration RadioApp is then installed on the radio equipment. In particular, FIG. 4 depicts the VRRS receiving a request 406 (DownLoadRA_Req(R1:RA)) from a radio equipment that comprises an RVM that is to be reconfigured. The VRRS sends a request 407 (DownLoadRA_PackageReq (RA_Package)) to the RadioApp vendor. In reply, the RadioApp vendor sends a response 408 (DownLoadRA_Package-Resp(RA_Package)) to the VRRS. At 409, the VRRS compiles the certified reconfiguration RadioApp using a back-end compiler that is specific for the target platform (e.g., a target radio platform that corresponds to the platform of the radio equipment). Exemplary target platforms include, but are not limited to, platforms relating to cellular wide area radio communication technology (which may include, e.g., a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (IG) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)).

The result of compilation is the exe code of the downloaded configuration RadioApp. At 410, a self-certification process is run using the compiled RVM together with the target platform. Upon successful self-certification, a response 411 (DownLoadRA_Resp(R1:RA) is sent to the radio equipment comprising the RVM that is to be reconfigured. FIG. 7, which is described in greater detail below, depicts a flow diagram for a self-certification process 700 according to the subject matter disclosed herein.

FIG. 7 depicts a flow diagram for a self-certification process 700 according to the subject matter disclosed herein. Process 700 begins at 701. In an exemplary embodiment in which the third certification phase is executed by the radio equipment on which the reconfigured RVM will operate (e.g., the sequence of FIG. 3), flow would continue from block 701 to 702 where the reconfiguration RadioApp is run on the radio equipment using established test vectors for the self-certification test, which may include, but are not limited to, input/output data, memory, flags, states, selected samples in time and/or frequency domain. The output (response) of the reconfigured RVM, which may include, but is not limited to, input/output data, memory, flags, states, selected samples in time and/or frequency domain, is stored.

In another exemplary embodiment in which the third certification phase is executed by a vendor radio reconfiguration service (e.g., the sequence of FIG. 4), flow would continue from block 701 to 703 where the reconfigured RVM is compiled and run on a target platform. The compiled exe code is run on the target platform using the established test vectors for the self-certification test, which may include, but are not limited to, input/output data, memory, flags, states, selected samples in time and/or frequency domain, that have been established for the self-certification test. The output (response) of the reconfigured RVM on the target platform, which may include input/output data, memory, flags, states, selected samples in time and/or frequency domain, is stored.

In either case, one exemplary embodiment may provide that selected components of the radio platform are placed in a special "tracing-state" mode. For example, the numerical precision of the analog-to-digital (ADC) and/or the digital-to-analog (DAC) may need to be changed, and/or the sampling frequency may need to be changed in order to obtain a suitable evaluation of out-of-band radiation levels, etc., of the reconfigured RVM for self-certification process 700. In such a situation, the tracing-state mode is entered as self-certification process 700 is performed. In situations in which the RVM that is to be reconfigured comprises of two or more components that can be are to be reconfigured individually, one exemplary embodiment provides that the individual reconfigured components of the RVM are certified sequentially until all reconfigured components of the RVM have been certified. In an exemplary alternative embodiment, a subset of reconfigured components of the RVM can be bundled together and certified simultaneously. That is, the certification of reconfigured components of an RVM can be performed individually in a sequence or grouped together in any convenient group size. In situations in which all reconfigured components of an RVM are certified individually or as a number of groups, the combination of all the reconfigured components of the RVM result in being certified jointly.

Following completion of block 702 or completion of block 703 depending on whether the sequence of FIG. 3 or FIG. 4 is being followed, flow continues to 704 where the stored output is compared to the output for a certified reconfigured RVM. If, at 705, the stored output the same at the output for a certified reconfigured RVM, flow continues to 706 where it is indicated that the self-certification process is successful. If, at 705, the stored output is not the same as the output for a certified reconfigured RVM, flow continues to 707 where it is indicated that the self-certification process was unsuccessful. In either case, flow continues to 708 where the self-certification process ends.

Figure 8:
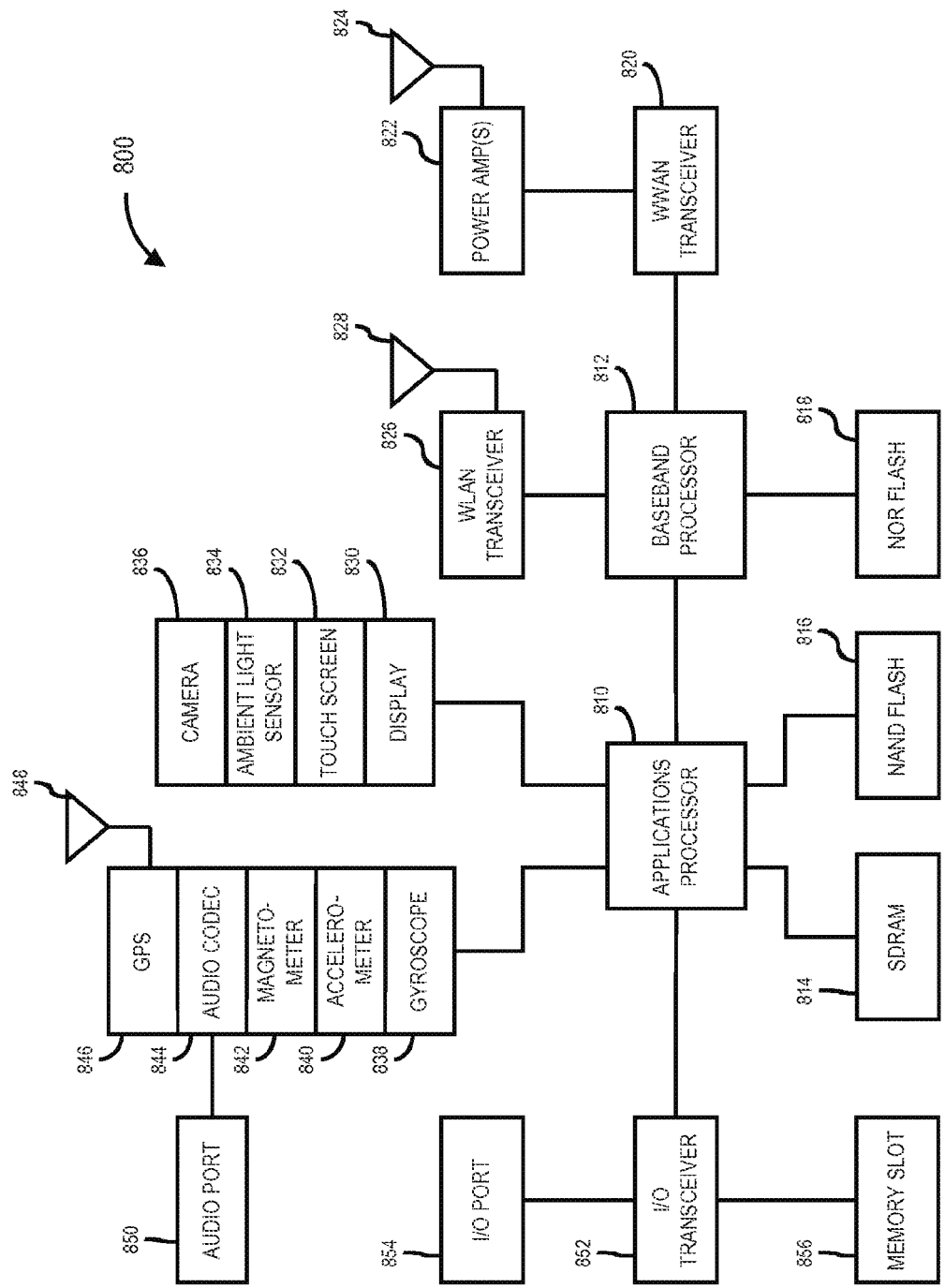
FIG. 8 depicts an exemplary functional block diagram of an information-handling system according to the subject matter disclosed herein.

FIG. 8 depicts an exemplary functional block diagram of an information-handling system 800 according to the subject matter disclosed herein. Information-handling system 800 of FIG. 8 may tangibly embody one or more reconfigurable RVMs that have been compiled to run on the underlying hardware of information-handling system 800 according to the subject matter disclosed herein. In one exemplary embodiment, information-handling system 800 may comprise a mobile-type device or information-handling system capable of wirelessly communicating via a wireless network, such as, but not limited to, a notebook-type computer, a cellular telephone, a personal digital assistant, an M2M-type device, or the like. Although information-handling system 800 represents one example of several types of computing platforms, information-handling system 800 may include more or fewer elements and/or different arrangements of elements than shown in FIG. 8, and the scope of the claimed subject matter is not limited in these respects.

In one or more embodiments, information-handling system 800 may comprise one or more applications processor 810 and a baseband processor 812. Applications processor 810 may be utilized as a general purpose processor to run applications and the various subsystems for information handling system 800, such as, but not limited to, one or more reconfigurable RVMs that have been compiled to run on the underlying hardware of information-handling system 800 according to the subject matter disclosed herein. Applications processor 810 may include a single core or alternatively may include multiple processing cores wherein one or more of the cores may comprise a digital signal processor or digital signal processing core. Furthermore, applications processor 810 may include a graphics processor or coprocessor disposed on the same chip, or alternatively a graphics processor coupled to applications processor 810 may comprise a separate, discrete graphics chip. Applications processor 810 may include onboard memory, such as cache memory, and further may be coupled to external memory devices such as synchronous dynamic random access memory (SDRAM) 814 for storing and/or executing applications, such as, but not limited to, one or more reconfigurable RVMs that have been compiled to run on the underlying hardware of information-handling system 800 according to the subject matter disclosed herein. During operation, and NAND flash 816 for storing applications and/or data even when information handling system 800 is powered off.

In one exemplary embodiment, a list of candidate nodes may be stored in SDRAM 814 and/or NAND flash 816. Further, applications processor 810 may execute computer-readable instructions stored in SDRAM 814 and/or NAND flash 816 that when executed result in, but not limited to, one or more reconfigurable RVMs that have been compiled to run on the underlying hardware of information-handling system 800 according to the subject matter disclosed herein.

In one exemplary embodiment, baseband processor 812 may control the broadband radio functions for information-handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example, for communicating via an IEEE 802.11ac network, a 3GPP LTE network and/a 4GPP LTE network or the like as discussed herein with respect to FIG. 8. The WWAN transceiver 820 couples to one or more power amplifiers 822 that are respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 810 and baseband processor 812, and the scope of the claimed subject matter is not limited in these respects. For example, any one or more of SDRAM 814, NAND flash 816 and/or NOR flash 818 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 810 may drive a display 830 for displaying various information or data, and may further receive touch input from a user via a touch screen 832, for example, via a finger or a stylus. In one exemplary embodiment, screen 832 display a menu and/or options to a user that are selectable via a finger and/or a stylus for entering information into information-handling system 800.

An ambient light sensor 834 may be utilized to detect an amount of ambient light in which information-handling system 800 is operating, for example, to control a brightness or contrast value for display 830 as a function of the intensity of ambient light detected by ambient light sensor 834. One or more cameras 836 may be utilized to capture images that are processed by applications processor 810 and/or at least temporarily stored in NAND flash 816. Furthermore, applications processor may be coupled to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information-handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information-handling system 800 via the audio ports 850, for example, via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory, such as secure digital (SD) card or a subscriber identity module (SIM) card, although the scope of the claimed subject matter is not limited in these respects.

Figure 9:
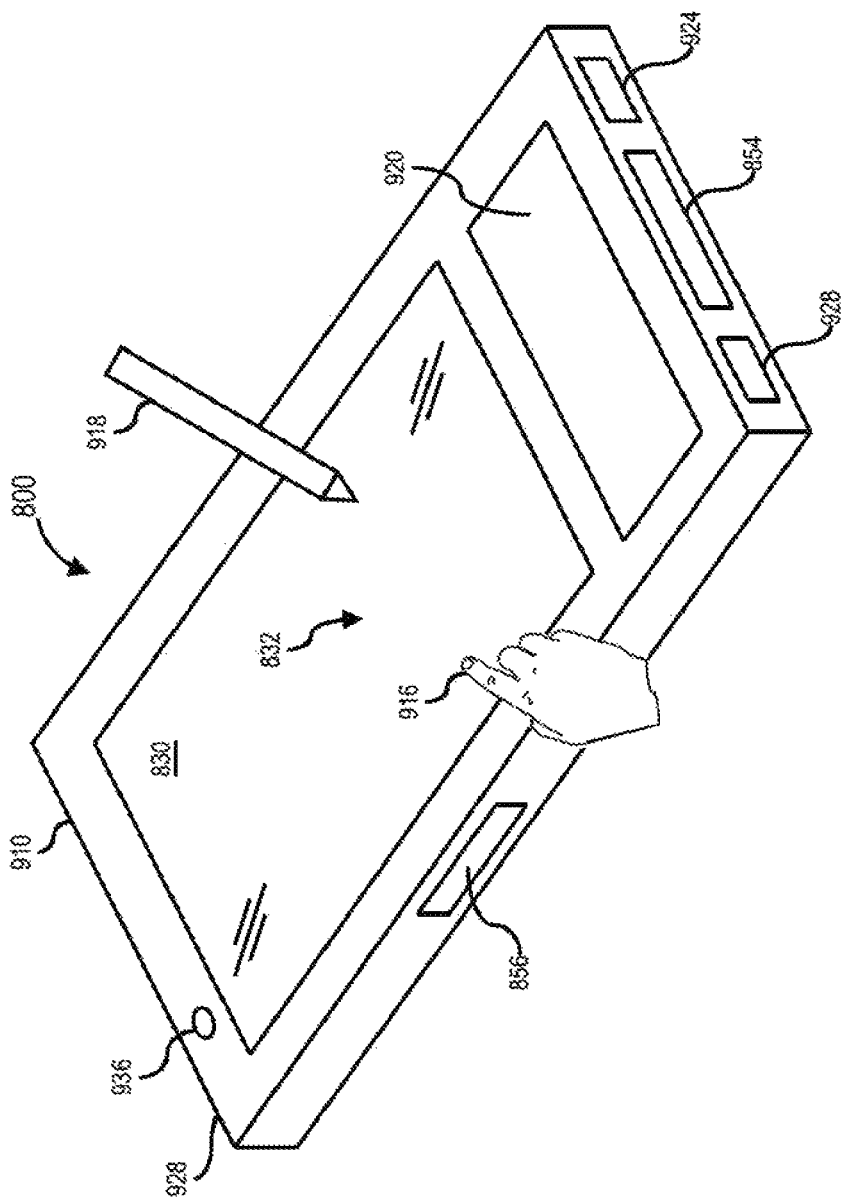
FIG. 9 depicts an isometric view of an exemplary embodiment of the information-handling system of FIG. 8 that optionally may include a touch screen in accordance with one or more embodiments disclosed herein.

FIG. 9 depicts an isometric view of an exemplary embodiment of the information-handling system of FIG. 8 that optionally may include a touch screen in accordance with one or more embodiments disclosed herein. FIG. 9 shows an example implementation of information-handling system 800 of FIG. 8 tangibly embodied as a cellular telephone, smartphone, smart-type device, or tablet-type device or the like, that may comprise one or more reconfigurable RVMs that have been compiled to run on the underlying hardware of information-handling system 800 according to the subject matter disclosed herein. The information-handling system 800 may comprise a housing 910 having a display 830 that may include a touch screen 832 for receiving tactile input control and commands via a finger 916 of a user and/or a via stylus 918 to control one or more applications processors 810. The housing 910 may house one or more components of information-handling system 800, for example, one or more applications processors 810, one or more of SDRAM 814, NAND flash 816, NOR flash 818, baseband processor 812, and/or WWAN transceiver 820. The information-handling system 800 further may optionally include a physical actuator area 920 that may comprise a keyboard or buttons for controlling information-handling system 800 via one or more buttons or switches. The information-handling system 800 may also include a memory port or slot 856 for receiving non-volatile memory, such as flash memory, for example, in the form of a secure digital (SD) card or a subscriber identity module (SIM) card. Optionally, the information-handling system 800 may further include one or more speakers and/or microphones 924 and a connection port 854 for connecting the information-handling system 800 to another electronic device, dock, display, battery charger, and so on. Additionally, information-handling system 800 may include a headphone or speaker jack 928 and one or more cameras 836 on one or more sides of the housing 910. It should be noted that the information-handling system 800 of FIGS. 8 and 9 may include more or fewer elements than shown, in various arrangements, and the scope of the claimed subject matter is not limited in this respect.

Figure 10:
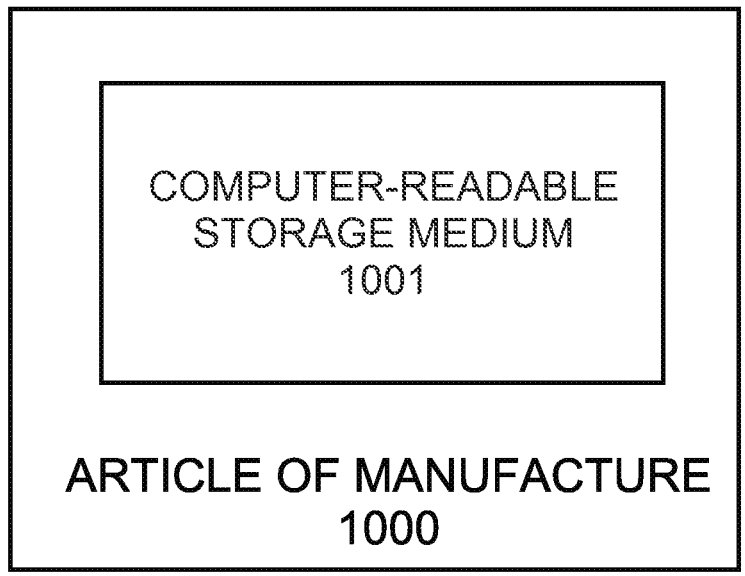
FIG. 10 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 10 depicts an exemplary embodiment of an article of manufacture 1000 comprising a non-transitory computer-readable storage medium 1001 having stored thereon computer-readable instructions that, when executed by a computer-type device, results in any of the various techniques and methods according to the subject matter disclosed herein. Exemplary computer-readable storage mediums that could be used for computer-readable storage medium 1001 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A radio equipment, comprising:
 a memory to store a Radio Virtual Machine (RVM); and
 a processor coupled to the memory to run the RVM to form
  a software execution environment comprising a selectable RVM class of a plurality of RVM classes, the selectable RVM class comprising an associated level of reconfigurability of low-level parameters of the RVM;

wherein the level of reconfigurability corresponds to a level of certification to certify the RVM in the event the RVM is reconfigured;

wherein the processor is configured to perform the level of certification based on a selected RVM class in response to the RVM being reconfigured;

wherein each RVM class of the plurality of RVM classes comprising a corresponding level of reconfigurability of low-level RVM parameters and a corresponding level of certification testing for reconfigured RVMs of the class, and the plurality of RVM classes comprising at least one RVM class comprising full reconfigurability of low-level RVM parameters and at least one RVM class comprising limited reconfigurability of low-level RVM parameters;

wherein the at least one RVM class comprising full reconfigurability of low-level RVM parameters further comprises a corresponding relatively thorough level of certification testing of reconfigured RVMs of the class, and wherein the at least one RVM class comprising limited reconfigurability of low-level RVM parameters further comprises a corresponding relatively less thorough level of certification testing of reconfigured RVMs of the class in comparison to the level of certification testing of reconfigured RVMs for the at least one RVM class comprising full reconfigurability of low-level RVM parameters.

2. The radio equipment according to claim 1, wherein the associated level of reconfigurability comprises a corresponding level of validation testing in the event the RVM has been reconfigured by third-party software to assure that the reconfigured RVM running on the radio equipment conforms to an applicable law, a regulation, or a standard, or a combination thereof, applicable to the operation of the radio equipment.

3. The radio equipment according to claim 1, wherein the RVM further comprises a reconfigured RVM that has been compiled to operate on hardware underlying the RVM.

4. The radio equipment according to claim 3, wherein the reconfigured RVM comprises the RVM that has been reconfigured by a reconfiguration radio application provided by a radio application developer.

5. The radio equipment according to claim 3, wherein the radio application developer comprises a third-party developer with respect to an original developer of the RVM.

6. The radio equipment according to claim 1, wherein the RVM further comprises at least one component that comprises an associated RVM class that establishes a level of reconfigurability of the component.

7. The radio equipment according to claim 1, wherein the radio equipment comprises part of a cellular telephone, smartphone, smart-type device, or tablet-type device.

8. The radio equipment according to claim 7, wherein the cellular telephone, smartphone, smart-type device, or tablet-type device further comprises a touchscreen display capable of receiving input information from a touch of a user or a stylus.

9. A radio equipment, comprising:
a waveform generator to receive input data and to generate output baseband waves corresponding to the received input data, the waveform generator comprising a Radio Virtual Machine (RVM) that has been compiled to operate on hardware underlying the RVM, and the RVM comprising an associated RVM class that establishes a level of reconfigurability of low-level parameters of the RVM;

a radio-frequency component to transform the baseband waves generated in radio waves;

wherein the level of reconfigurability corresponds to a level of certification to certify the RVM in the event the RVM is reconfigured;

wherein the waveform generator is configured to perform the level of certification based on a selected RVM class in response to the RVM being reconfigured;

wherein the RVM class associated with the RVM comprises one of a plurality of RVM classes, each RVM class of the plurality of RVM classes comprising a corresponding level of reconfigurability of low-level RVM parameters and a corresponding level of certification testing for reconfigured RVMs of the class, and the plurality of RVM classes comprising at least one RVM class comprising full reconfigurability of low-level RVM parameters and at least one RVM class comprising limited reconfigurability of low-level RVM parameters;

wherein the at least one RVM class comprising full reconfigurability of low-level RVM parameters further comprises a corresponding relatively thorough level of certification testing of reconfigured RVMs of the class, and wherein the at least one RVM class comprising limited reconfigurability of low-level RVM parameters further comprises a corresponding relatively less thorough level of certification testing of reconfigured RVMs of the class in comparison to the level of certification testing of reconfigured RVMs for the at least one RVM class comprising full reconfigurability of low-level RVM parameters.

10. The radio equipment according to claim 9, wherein the radio equipment comprises part of a cellular telephone, smartphone, smart-type device, or tablet-type device.

11. The radio equipment according to claim 10, wherein the cellular telephone, smartphone, smart-type device, or tablet-type device further comprises a touchscreen display capable of receiving input information from a touch of a user or a stylus.

12. A method to arrange a radio equipment, the method comprising:
compiling a Radio Virtual Machine (RVM) to run on selected hardware underlying the RVM, the RVM comprising an associated RVM class that establishes a level of reconfigurability of low-level parameters of the RVM, wherein the level of reconfigurability corresponds to a level of certification to certify the RVM in the event the RVM is reconfigured;

running the compiled RVM on the selected hardware underlying the RVM to form the radio equipment;

performing the level of certification based on a selected RVM class in response to the RVM being reconfigured;

wherein the RVM class associated with the RVM comprises one of a plurality of RVM classes, each RVM class of the plurality of RVM classes comprising a corresponding level of reconfigurability of low-level RVM parameters and a corresponding level of certification testing for reconfigured RVMs of the class, and the plurality of RVM classes comprising at least one RVM class comprising full reconfigurability of low-level RVM parameters and at least one RVM class comprising limited reconfigurability of low-level RVM parameters;

wherein the at least one RVM class comprising full reconfigurability of low-level RVM parameters further comprises a corresponding relatively thorough level of certification testing of reconfigured RVMs of the class, and wherein the at least one RVM class comprising limited reconfigurability of low-level RVM parameters further comprises a corresponding relatively less thorough level of certification testing of reconfigured RVMs of the class in comparison to the level of certification testing of reconfigured RVMs for the at least one RVM class comprising full reconfigurability of low-level RVM parameters.

13. The method according to claim 12, wherein the radio equipment comprises part of a cellular telephone, smartphone, smart-type device, or tablet-type device.

14. The method according to claim 13, wherein the cellular telephone, smartphone, smart-type device, or tablet-type device further comprises a touchscreen display capable of receiving input information from a touch of a user or a stylus.

15. An information-handling system, comprising:
a memory to store a Radio Virtual Machine (RVM), the RVM being compiled to operate on hardware underlying the RVM, the RVM comprising an associated RVM class that establishes a level of reconfigurability of low-level parameters of the RVM; and
a processor coupled to the memory to run the RVM to form a waveform generator to receive input data and to generate output baseband waves corresponding to the received input data, the waveform generator comprising the RVM that has been compiled to operate on hardware underlying the RVM;
a radio-frequency component to transform the baseband waves generated in radio waves;
wherein the level of reconfigurability corresponds to a level of certification to certify the RVM in the event the RVM is reconfigured;
wherein the processor is configured to perform the level of certification based on a selected RVM class in response to the RVM being reconfigured;
wherein the RVM class associated with the RVM comprises one of a plurality of RVM classes, each RVM class of the plurality of RVM classes comprising a corresponding level of reconfigurability of low-level RVM parameters and a corresponding level of certification testing for reconfigured RVMs of the class, and the plurality of RVM classes comprising at least one RVM class comprising full reconfigurability of low-level RVM parameters and at least one RVM class comprising limited reconfigurability of low-level RVM parameters;
wherein the at least one RVM class comprising full reconfigurability of low-level RVM parameters further comprises a corresponding relatively thorough level of certification testing of reconfigured RVMs of the class, and
wherein the at least one RVM class comprising limited reconfigurability of low-level RVM parameters further comprises a corresponding relatively less thorough level of certification testing of reconfigured RVMs of the class in comparison to the level of certification testing of reconfigured RVMs for the at least one RVM class comprising full reconfigurability of low-level RVM parameters.

16. The information-handling system according to claim 15, wherein the radio equipment comprises part of a cellular telephone, smartphone, smart-type device, or tablet-type device.

17. The information-handling system according to claim 16, wherein the cellular telephone, smartphone, smart-type device, or tablet-type device further comprises a touchscreen display capable of receiving input information from a touch of a user or a stylus.

* * * * *